C. M. GOODRICH.
SCALE.
APPLICATION FILED MAY 25, 1914.
1,140,813.
Patented May 25, 1915.
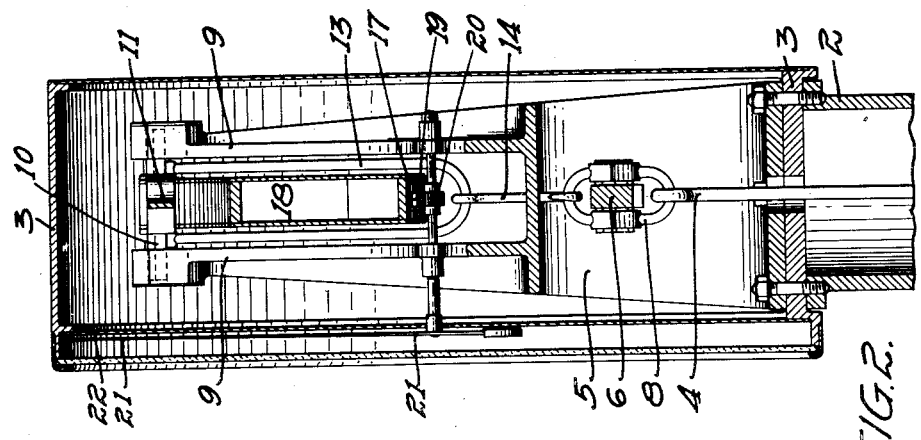
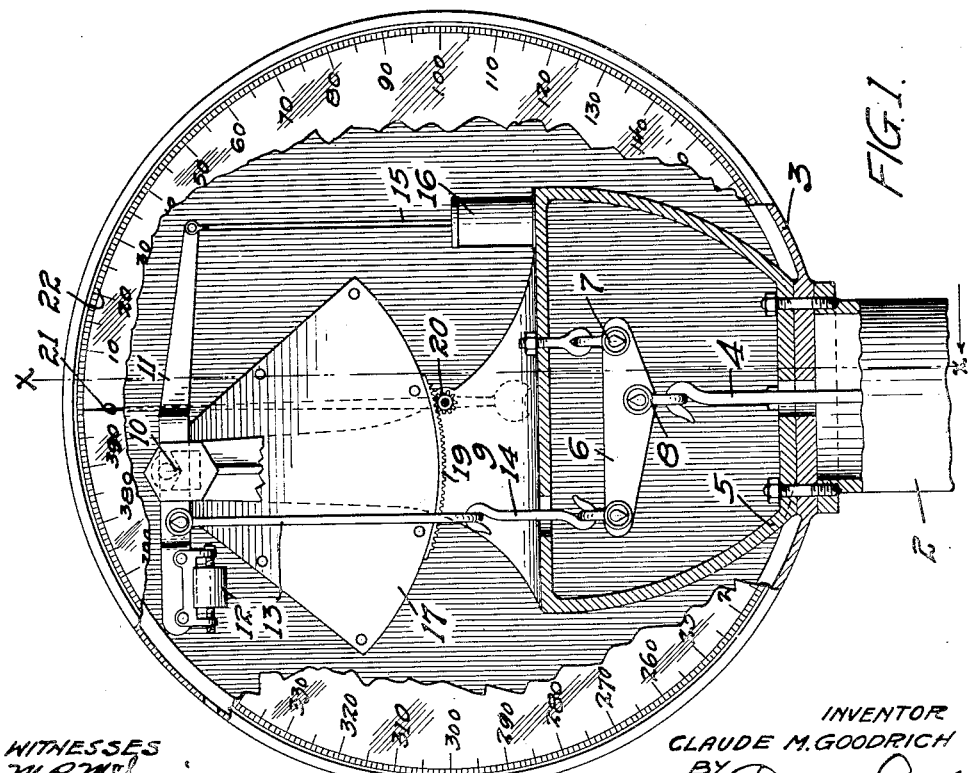
WITNESSES
M. R. McInnis
E. A. Paul
INVENTOR
CLAUDE M. GOODRICH
BY
Paul & Paul
ATTORNEYS

UNITED STATES PATENT OFFICE.

CLAUDE MOULTON GOODRICH, OF ST. PAUL, MINNESOTA, ASSIGNOR OF ONE-HALF TO McFARLANE MANUFACTURING COMPANY, OF ST. PAUL, MINNESOTA, A CORPORATION.

SCALE.

1,140,813.   Specification of Letters Patent.   Patented May 25, 1915.

Application filed May 25, 1914. Serial No. 840,762.

*To all whom it may concern:*

Be it known that I, CLAUDE M. GOODRICH, citizen of the United States, resident of St. Paul, county of Ramsey, State of Minnesota, have invented certain new and useful Improvements in Scales, of which the following is a specification.

The object of my invention is to provide a scale of simple, durable construction and one which will be positive and accurate in operation, and in the construction of which the use of springs is eliminated.

A further object is to provide a scale having means for convenient and accurate balancing.

Other objects of the invention will appear from the following detailed description.

The invention consists generally in various constructions and combinations, all as hereinafter described and particularly pointed out in the claims.

In the accompanying drawings forming part of this specification, Figure 1 is a front view, partially broken, of a weighing scale embodying my invention, Fig. 2 is a vertical sectional view on the line x—x of Fig. 1.

In the drawing, 2 represents a suitable standard whereon the casing 3, preferably circular in form, is mounted. A scale rod 4 is vertically movable in the standard 2 and connected at its lower end to the scale levers, not shown. A bracket 5 is supported on the standard 2 within the casing 3 and a lever 6 has a pivotal connection 7 at one end with the bracket 5 and a similar connection 8 adjacent to the middle portion of the lever with the scale rod 4. The standards 9 are mounted on the bracket 5 and project upwardly therefrom within the casing 3 and have knife-edge bearings 10 near the top of the standards for the beam 11, said bearings being located on opposite sides of and near the middle portion of said beam. A balance weight 12 is provided on the short arm of said beam and rods 13 and 14 pivotally connect the said beam between its balance weight and its pivots with the opposite end of the lever 6 from the pivot 7. The long arm of the beam 11 has a rod 15 connected thereto extending to the piston of a dash-pot cylinder 16 for regulating the movement of the beam in the usual way. Centrally mounted on the pivot 10 of the beam 11 is a weight device 17. This weight device may be of any suitable shape and construction, but preferably is substantially sector-shaped and made of sheet metal with an interior chamber or space 18 into which a suitable material, such as lead, is poured. The chamber in the sector-shaped weight device will usually be filled with lead to form a solid mass therein, the weight being proportioned or determined by the desired capacity of the scale, and when the part 17 is loaded or filled with lead, it will remain unchanged thereafter, the proper adjustment of the parts to set the indicator hand at zero being obtained by the balance weight 12.

The pendulum weight device 17 has a curved periphery on which the rack bar 19 is mounted to engage a pinion 20 on the indicator hand 21, arranged to move over the graduations of the dial 22. I employ the force of gravity in this scale without the use of springs, the tendency of the pendulum weight 17 to swing back to its vertical position when tilted by the pull on the beam 11 being utilized to counteract the pull of the load on the scale and platform. The travel of this pendulum weight is comparatively slight, and the movement of the indicator hand is multiplied to such an extent that any slight inaccuracy in the movement of the pendulum weight will be insufficient to affect the indicator hand, and I am able, therefore, to equally space the graduations of the dial.

In setting up the scale, the size of the pendulum weight and the amount of the lead or other material placed therein will be accurately figured, based upon the capacity of the scale, the diameter of the sector being varied as the diameter of the scale dial may require. The beam 11 being rigidly connected to the pendulum weight, will, through the pull of the scale rod, swing this weight on the pivots 10 to a position at one side of the vertical, where the force of gravity will be utilized to resist the pull of the scale rod, the movement of the weight being transmitted to the indicator hand, causing it to travel over the face of the dial and indicate thereon the weight of the load on the scale.

The device is of simple construction, easy of adjustment and as all springs are eliminated, the weighing operation will be accurate, with practically no variation when once the scale is properly balanced.

In various ways the details of construction herein shown and described may be modified and still be within the scope of my invention.

I claim as my invention:

1. A scale comprising a beam, a scale rod connected thereto, a pendulum weight secured to the pivots of said beam and having its weight equally distributed on each side of the vertical axis of the beam pivots when the scale is without load, and an indicator hand geared to said pendulum weight.

2. A scale comprising a pivoted beam having a balancing means, a sector-shaped member secured to said beam to oscillate therewith, said member being weighted to normally hang in a vertical position, a dial and indicator hand therefor operatively connected with said sector-shaped member, and a lever pivotally supported at one end and having a pivotal connection at its other end with the short arm of said beam, and a scale rod pivotally connected to the middle portion of said lever.

3. A scale comprising a pivoted beam having a balancing means, a scale rod pivotally connected to said beam, a pendulum weight concentric with the pivot of said beam to oscillate therewith, a curved rack-bar secured to the periphery of said pendulum weight, a dial, an indicator hand therefor, and a pinion mounted on the post of said indicator hand and meshing with said rack bar.

4. A weighing scale comprising a beam pivoted at a point intermediate to its ends, a scale rod and means pivotally connecting it to said beam at one side of the pivot of said beam, a weighted pendulum mounted concentric with the pivots of said beam to oscillate in a vertical plane therewith, and an indicator hand geared to said pendulum.

5. In a scale, the combination, with the upright standards, of a beam pivotally supported between them, a pendulum weight carried by the pivots of said beam and depending between said standards, a U-shaped rod straddling said pendulum weight and pivotally connected with said beam, a scale rod, and means connecting said scale rod with said U-shaped rod.

6. A scale comprising a beam and pivots therefore, a pendulum weight secured to the pivots of said beam and depending therefrom and adapted to contain a suitable filler proportioned to the desired capacity of the scale, a scale rod operatively connected with said beam, and an indicator hand geared to said pendulum weight.

In witness whereof, I have hereunto set my hand this 22d day of May 1914.

CLAUDE MOULTON GOODRICH.

Witnesses:
GENEVIEVE E. SORENSEN,
EDWARD A. PAUL.